US009918014B2

(12) United States Patent
Ichihara et al.

(10) Patent No.: US 9,918,014 B2
(45) Date of Patent: Mar. 13, 2018

(54) CAMERA APPARATUS AND METHOD FOR GENERATING IMAGE SIGNAL FOR VIEWFINDER

(71) Applicant: Sony Corporation, Minato-ku (JP)

(72) Inventors: Yusuke Ichihara, Kanagawa (JP); Koji Kamiya, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/209,294

(22) Filed: Jul. 13, 2016

(65) Prior Publication Data

US 2016/0353032 A1 Dec. 1, 2016

Related U.S. Application Data

(63) Continuation of application No. 14/493,530, filed on Sep. 23, 2014, now Pat. No. 9,459,514.

(30) Foreign Application Priority Data

Nov. 5, 2013 (JP) ................................ 2013-229013
Jul. 25, 2014 (JP) ................................ 2014-151428

(51) Int. Cl.
*H04N 5/232* (2006.01)
*G03B 13/18* (2006.01)
*G03B 13/16* (2006.01)

(52) U.S. Cl.
CPC ......... *H04N 5/23293* (2013.01); *G03B 13/16* (2013.01); *G03B 13/18* (2013.01); *H04N 5/23212* (2013.01)

(58) Field of Classification Search
CPC ..... H04N 1/00408; G03B 13/18; G02B 27/16
See application file for complete search history.

(56) References Cited

U.S. PATENT DOCUMENTS 6,750,913 B1 6/2004 Noro
6,937,284 B1 8/2005 Singh
7,324,151 B2 1/2008 Onozawa
8,350,945 B2 1/2013 Yumiki
9,459,514 B2 * 10/2016 Ichihara ............ H04N 5/23293
2004/0165879 A1 * 8/2004 Sasaki ............... H04N 5/23212 396/137
2010/0208122 A1 * 8/2010 Yumiki ................ G02B 7/021 348/333.08

(Continued)

FOREIGN PATENT DOCUMENTS

JP HEI 10-126653 5/1998
JP 2001-326834 11/2001
JP 2004-280048 10/2004

(Continued)

OTHER PUBLICATIONS

Japanese Office Action dated Nov. 28, 2017 in Japanese Application No. 2014-151428 with English Translation), 13 pages.

*Primary Examiner* — James Hannett
(74) *Attorney, Agent, or Firm* — Oblon, McClelland, Maier & Neustadt, L.L.P.

(57) ABSTRACT

There is provided a camera apparatus including: a display signal generation unit that generates an index display signal for displaying an index indicative of a current focal position based on focal position information; and a combination unit that acquires an image signal for a viewfinder by combining a captured image signal with the index display signal.

13 Claims, 12 Drawing Sheets

(56) References Cited

U.S. PATENT DOCUMENTS

| | | | |
|---|---|---|---|
| 2014/0079279 | A1 | 3/2014 | Pulli |
| 2014/0198244 | A1 | 7/2014 | Hamada |

FOREIGN PATENT DOCUMENTS

| | | |
|---|---|---|
| JP | 2009-122289 | 6/2009 |
| JP | 2009-296266 | 12/2009 |
| JP | 2010-161785 | 7/2010 |
| JP | 2012-173329 | 9/2012 |
| WO | WO 2009/050860 A1 | 4/2009 |

* cited by examiner

CAMERA APPARATUS AND METHOD FOR GENERATING IMAGE SIGNAL FOR VIEWFINDER

CROSS REFERENCE TO RELATED APPLICATIONS

The present continuation application claims the benefit of Priority under 35 U.S.C. § 120 to application Ser. No. 14/493,530, filed Sep. 23, 2014, and claims the benefit of priority under 35 U.S.C. § 119 from Japanese Patent Application JP 2013-229013 filed Nov. 5, 2013 and Japanese Priority Patent Application JP 2014-151428 filed Jul. 25, 2014, the entire contents of all of which are incorporated herein by reference.

BACKGROUND

The present disclosure relates to a camera apparatus and a method for generating an image signal for a viewfinder, and, in particular, to a camera apparatus which is used by connecting a lens apparatus capable of performing focus adjustment using a focus demand thereto.

In the related art, a camera apparatus connecting a lens apparatus capable of performing focus adjustment using a focus demand (focus controller) thereto (for example, refer to Japanese Unexamined Patent Application Publication No. 2012-173329) has been used. The focus demand is used when focus control is performed based on manual focusing, and a cameraman can adjust a focal position between NEAR (close distance) and FAR (infinite distance) by performing a rotation operation on the focus demand.

SUMMARY

When focus adjustment is performed using a focus demand, it is convenient for a cameraman if it is possible to check the approximate position of a current focal position without moving away the line of sight of a viewfinder.

In the related art, when a cameraman uses the focus demand, the cameraman performs, for example, an operation to previously leave a sign for a rotational operation position for focusing on a specific position using a marking tape or the like, and to focus on the specific position with reference to the sign when actually operating the focus demand. However, in the method, the cameraman should move away from the line of sight of the viewfinder in order to check an operation position. In addition, in the method, when the focus demand is configured to include a multi-rotation rotary encoder, the sign does not completely indicate the rotational operation position for focusing on the specific position.

It is desirable to provide a camera apparatus capable of excellently performing focus adjustment using a focus demand.

According to an embodiment of the present disclosure, there is provided a camera apparatus including: a display signal generation unit that generates an index display signal for displaying an index indicative of a current focal position based on focal position information; and a combination unit that acquires an image signal for a viewfinder by combining a captured image signal with the index display signal.

According to the embodiment of the present disclosure, the display signal generation unit generates the index display signal for displaying the index indicative of the current focal position based on the focal position information. For example, the focal position information is transmitted from a lens apparatus which is connected to the camera apparatus and which is capable of performing focus adjustment by a focus demand. The combination unit acquires the image signal for the viewfinder by combining the captured image signal with the index display signal.

In the embodiment of the present disclosure, the image signal for the viewfinder is acquired by combining the captured image signal with the index display signal for displaying the index indicative of the current focal position. Therefore, in the viewfinder, the index indicative of the current focal position is displayed together with a captured image. Therefore, a cameraman can check the approximate position of the current focal position without moving away the line of sight of the viewfinder, thereby excellently performing focus adjustment using the focus demand.

Meanwhile, in the embodiment of the present disclosure, for example, the camera apparatus may further include a focal position registration unit that registers a focal position. The display signal generation unit may generate a position marker display signal for displaying a position marker indicative of the registered focal position on a movement path of the index, together with the index display signal, and the combination unit may acquire the image signal for the viewfinder by combining the captured image signal with the index display signal and the position marker display signal.

In this case, in the viewfinder, the position marker indicative of the registered focal position is displayed on the movement path of the index. The position marker indicates, for example, the focal position for focusing on a specific position. Therefore, the cameraman can easily focus on the specific position by operating the focus demand such that the display position of the index approaches the display position of the position marker.

For example, the focal position registration unit may register the current focal position according to a user operation based on a UI display. In addition, for example, the focal position registration unit may register the current focal position based on information about an operation of a switch for registering the focal position. Further, in this case, the focal position registration unit may release a focal position registration state based on the information about the operation of the switch for registering the focal position when the focal position registration unit is in the focal position registration state.

In addition, in the embodiment of the present disclosure, for example, the display signal generation unit may generate the index display signal and the position marker display signal such that the position marker is arranged in front of the index when a display width of the index in a movement direction of the index is larger than a display width of the position marker and a display of the index overlaps with a display of the position marker. For example, the camera apparatus may further include a width adjustment unit that adjusts the display width of the index.

In this case, since the display width of the index in the movement direction is large, it is possible to enhance the visibility of the index by the cameraman. In addition, in this case, since the position marker is arranged in front of the index when the display width of the index in the movement direction of the index is larger than the display width of the position marker and the display of the index overlaps with the display of the position marker, the cameraman can easily match the focal position to the focal position indicated by the position marker based on the balance of the sizes of the right and left areas of the index which are divided by the position marker.

In addition, in the embodiment of the present disclosure, for example, the camera apparatus may further include a display color registration unit that registers a display color of the position marker indicative of the focal position in association with registration of the focal position, and the display signal generation unit may generate the position marker display signal for displaying the position marker indicative of the registered focal position such that the position marker is displayed using the registered display color. In this case, when a plurality of focal positions are registered, the respective display colors are registered, and thus the cameraman can identify position markers relevant to a plurality of specific positions using the display colors.

In this case, for example, the display signal generation unit, when the display of the index overlaps with the display of the position marker, may generate a color display signal for displaying the same color as the display color of the position marker in some or all areas of ends of the captured image, together with the index display signal and the position marker display signal, and the combination unit may acquire the image signal for the viewfinder by combining the captured image signal with the index display signal, the position marker display signal, and the color display signal.

In this case, when the focus demand is operated such that the display position of the index overlaps with the display position of a prescribed position marker, the same color as the display color of the position marker is displayed in some or all areas of the ends of the captured image in the viewfinder. Therefore, the cameraman can easily check which position marker is matched with the index and which position of the subject is focused.

In addition, in the embodiment of the present disclosure, for example, the camera apparatus may further include a position name registration unit that registers the position name (the name of the position of the subject to be focused) corresponding to the focal position in association with registration of the focal position. The display signal generation unit, when the display of the index overlaps with the display of the position marker, may generate a position name display signal for displaying the registered position name, together with the index display signal and the position marker display signal, and the combination unit may acquire the image signal for the viewfinder by combining the captured image signal with the index display signal, the position marker display signal, and the position name display signal.

In this case, when the focus demand is operated such that the display position of the index overlaps with the display position of the prescribed position marker, the position name corresponding to the focal position indicated by the prescribed position marker is displayed in the viewfinder. Therefore, the cameraman can easily check which position marker is matched with the index and which position of the subject is focused.

In addition, in the embodiment of the present disclosure, for example, the display signal generation unit, when the current focal position indicated by the focal position information enters a constant range in which the registered focal position is set to a center, may generate the index display signal such that a display state of the index is changed. In this case, for example, the camera apparatus may further include a range adjustment unit that adjusts a size of the constant range. In addition, in this case, the change in the display state of the index may include change in a shape and a color. When the display state of the index is changed as above, the cameraman can easily understand that the current focal position approximately coincides with the registered focal position indicated by the position marker.

According to the embodiment of the present disclosure, focus adjustment can be excellently performed using the focus demand. Meanwhile, advantages described in the specification are only examples and does not limit the present disclosure. In addition, additional advantages may be provided.

DETAILED DESCRIPTION OF EMBODIMENTS

Hereinafter, a mode for carrying out the present disclosure (hereinafter, referred to as an "embodiment") will be described. Meanwhile, description will be made in the following order:

1. Embodiment
2. Modification example

1. Embodiment

Example of Configuration of Camera System

Figure 1:
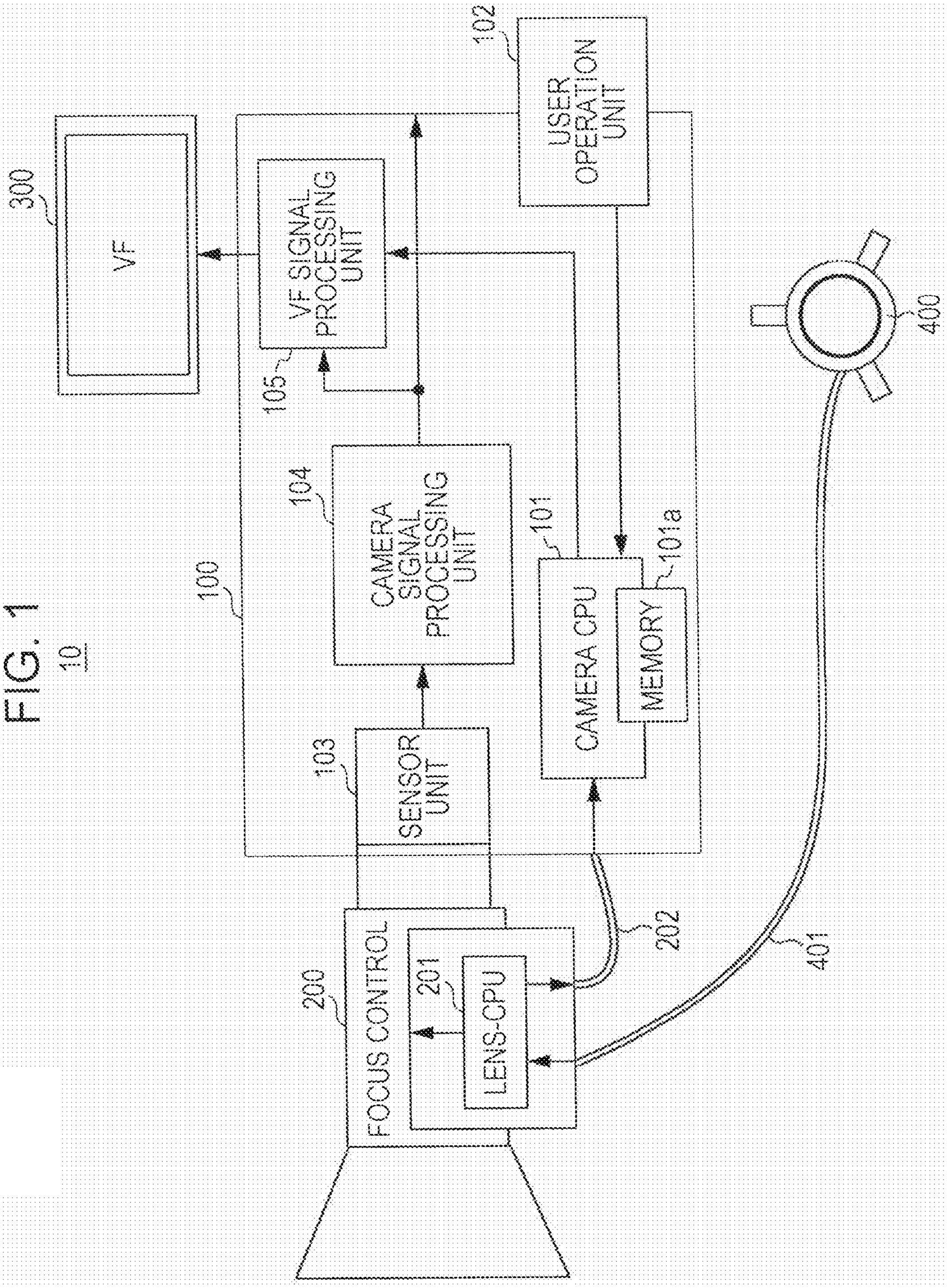
FIG. 1 is a block diagram illustrating an example of the configuration of a camera system according to an embodiment.

FIG. 1 illustrates an example of the configuration of a camera system 10 according to an embodiment. The camera system 10 includes a camera apparatus 100, a lens apparatus 200, and a viewfinder 300. The lens apparatus 200 is attached to a lens mounted section which is the front section of the camera apparatus 100.

The lens apparatus 200 is capable of performing focus adjustment based on a focus demand (focus controller) 400. The lens apparatus 200 includes a lens CPU 201 that controls various operations of the lens apparatus 200. The lens CPU 201 controls a focus based on a focus adjustment signal transmitted from the focus demand 400 through a cable 401.

The camera apparatus 100 includes a camera CPU 101, a user operation unit 102, a sensor unit 103, a camera signal processing unit 104, and a VF signal processing unit 105. The camera CPU 101 controls the operation of each of the units of the camera apparatus 100. The user operation unit 102 is connected to the camera CPU 101, and forms a user interface such that a user performs various operations. In the embodiment, when a cameraman (user) operates the user operation unit 102, it is possible to register a focal position or the like. An operation of registering a focal position will be described in detail later.

The sensor unit 103 includes an imaging element, such as a CMOS image sensor, and outputs a captured image signal corresponding to a subject. The subject is focused on the captured surface of the imaging element by the above-described lens apparatus 200. The camera signal processing unit 104 processes the captured image signal output from the sensor unit 103, and outputs an image signal as the output of the camera apparatus 100. The camera signal processing unit 104 performs, for example, a process such as gain control, white balance adjustment, or gamma correction.

The VF signal processing unit 105 generates an image signal for a viewfinder based on the image signal output from the camera signal processing unit 104, and transmits the generated image signal to the viewfinder 300. The VF signal processing unit 105 generates, for example, an index display signal, a position marker display signal, and a position name display signal based on the display control signal transmitted from the camera CPU 101. Further, the VF signal processing unit 105 combines the display signals with the image signal (captured image signal) output from the camera signal processing unit 104, and generates the image signal for the viewfinder.

Here, the index display signal is a display signal for displaying an index indicative of a current focal position. The position marker display signal is a display signal for displaying a position marker indicative of a registered focal position on a movement path of the above-described index. The position name display signal is a display signal for displaying, when the focal position is registered, a position name which is registered ancillary to the focal position (name of the position of the subject to be focused).

Focal position information indicative of a current focal position is transmitted to the camera CPU 101 from the lens CPU 201 through a cable 202. The camera CPU 101 generates a display control signal used to generate the index display signal for displaying the index indicative of the current focal position based on the focal position information, and transmits the display control signal to the VF signal processing unit 105.

Figure 2A:
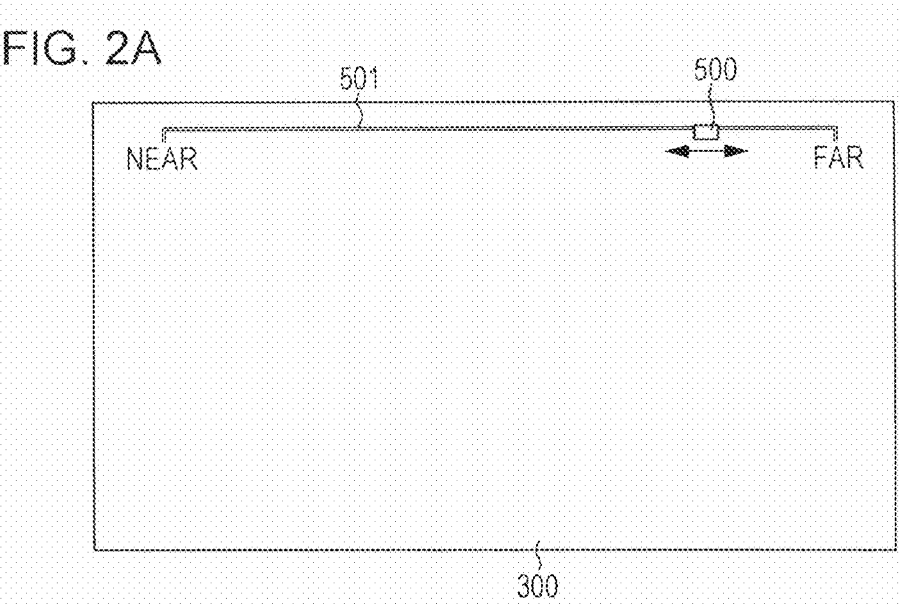
FIGS. 2A to 2C are diagrams illustrating examples of the display of an index indicative of a current focal position in a viewfinder.

FIG. 2A illustrates an example of the display of an index 500 which indicates the current focal position in the viewfinder 300. Meanwhile, although a captured image is simultaneously displayed, the captured image is not shown here for the simplification of the drawings. A guideline 501 is displayed between a display section "NEAR (close distance)" and a display section "FAR (infinite distance)". When a cameraman performs focus adjustment using the focus demand 400, the display position of the index 500 moves to a NEAR side or a FAR side on the guideline 501 according to the change in the current focal position.

Figure 2B:
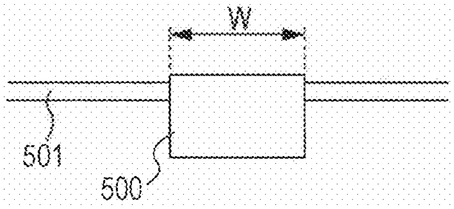

The index 500 has, for example, a rectangular shape, and is displayed using a white color. As shown in FIG. 2B, the display width W of the index 500 in the movement direction is relatively large in order to enhance the visibility of the cameraman. A user can adjust the display width W of the index 500 continuously or step by step. In this case, the user adjusts the display width W by performing a user operation (menu operation) based on a UI display using, for example, the user operation unit 102.

Figure 2C:
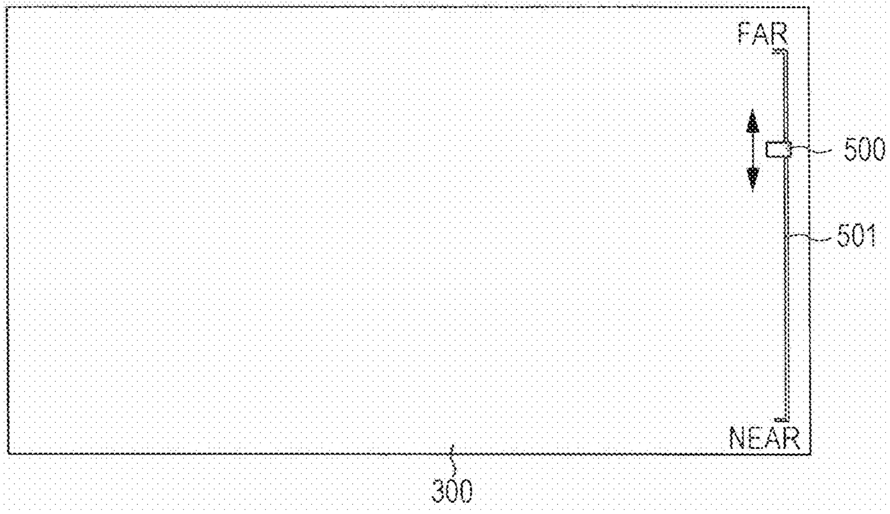

FIG. 2C illustrates another example of the display of the index 500 indicative of the current focal position in the viewfinder 300. In the example of the display in FIG. 2A, the guideline 501 extends in the horizontal direction, and the display position of the index 500 moves in the horizontal direction according to a change in the focal position. However, in the example of the display in FIG. 2C, the guideline 501 extends in the vertical direction, and the display position of the index 500 moves in the vertical direction according to the change in the focal position. In addition, in the example of the display in FIGS. 2A and 2C, the guideline 501 is displayed. However, from a point of view that the display on the screen of the viewfinder 300 is minimized as small as possible, it is conceivable that the guideline 501 is not displayed.

Returning to FIG. 1, when the cameraman (user) operates the user operation unit 102 and performs a user operation (menu operation) based on the UI display, it is possible to register the focal position (position marker). In this case, it is possible to register the focal position to focus on the specific position of the subject in advance, and it is possible to use the focal position as focal position information when the specific position is focused during an actual operation.

Figure 3A:
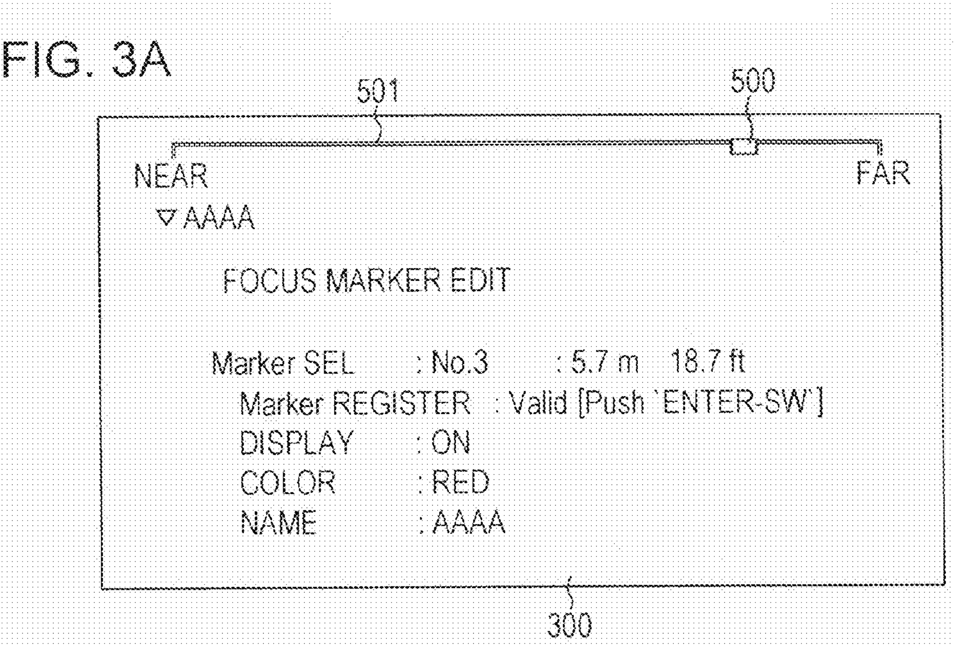
FIGS. 3A to 3C are diagrams illustrating examples of the UI display of the viewfinder in a focal position registration/edit mode.

An example of a focal position registration procedure will be described. First, the camera CPU 101 causes the camera apparatus 100 to be in a focal position registration/edit mode based on the operation performed by the cameraman using the user operation unit 102. FIG. 3A illustrates an example of the UI display of the viewfinder 300 in the registration/edit mode. Meanwhile, although a captured image is simultaneously displayed, the captured image is not shown here for the simplification of the drawings.

The cameraman operates the user operation unit 102 based on the UI display, and selects an arbitrary number as a position marker number in an item of "Marker SEL". Thereafter, the cameraman performs focus adjustment by operating the focus demand 400 and focuses on the specific position of the subject. When the focus adjustment is performed, the display position of the index 500 displayed in the viewfinder 300 moves according to change in the current focal position, and finally settles in a position corresponding to the focal position for focusing on the specific position.

In this state, when the cameraman operates a registration button of the user operation unit 102, the camera CPU 101 registers the focal position in a memory 101*a*. In this case, the current focal position information is stored in association with the position marker number in the memory 101*a*.

Figure 3B:
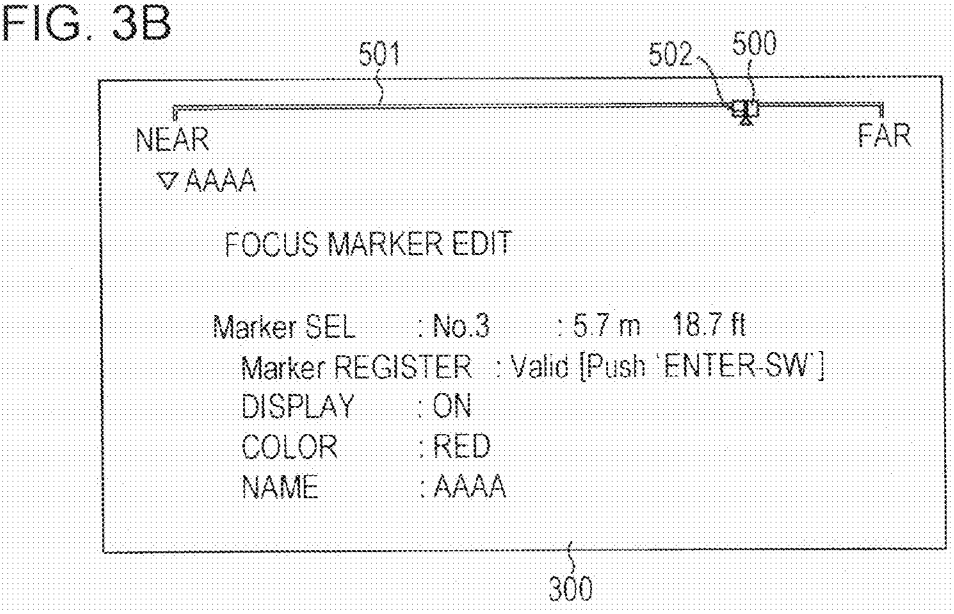
Figure 3C:
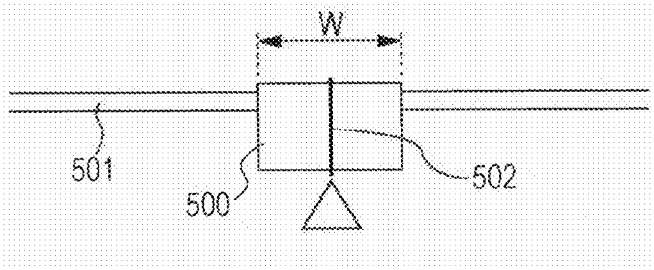

When a registration operation is performed as described above, the position marker 502 indicative of a registered focal position is displayed in the index 500 indicative of the current focal position in the viewfinder 300 as shown in FIG. 3B. As shown in FIG. 3C, the width of the position marker 502 in a direction that the index 500 moves is significantly reduced in size compared to the width W of the index 500, and thus the registered focal position is shown with high accuracy. At this time, the camera CPU 101 generates the display control signal for generating the position marker display signal for displaying the position marker 502 based on the registered focal position information, and transmits the display control signal to the VF signal processing unit 105.

The VF signal processing unit 105 generates the position marker display signal based on the display control signal. Meanwhile, the position marker signal is generated such that the position marker 502 is displayed using a registered display color, as will be described later. Further, the VF signal processing unit 105 combines the captured image signal with the position marker display signal together with the above-described index display signal, generates the image signal for the viewfinder, and transmits the image signal for the viewfinder to the viewfinder 300. Meanwhile, when the display of the index 500 overlaps with the display of the position marker 502, the VF signal processing unit 105 generates the index display signal and the position marker display signal such that the position marker 502 is arranged in front of the index 500.

The cameraman can register the above-described focal position (position marker), the display color of the position marker 502, the position name, and can set the display/non-display of the position marker 502 in the focal position registration/edit mode. The camera CPU 101 stores the registrations and settings in association with the position marker number in the memory 101*a*.

With regard to the display color of the position marker 502, the cameraman operates the user operation unit 102, selects a "COLOR" item, and registers an arbitrary color. In FIGS. 3A and 3B, "RED" is selected. In addition, with regard to position name registration, the cameraman operates the user operation unit 102, selects a "NAME" item, and registers an arbitrary name. In FIGS. 3A and 3B, "AAAA" is selected. Meanwhile, the name indicates, for example, the specific position of the subject to be focused on the registered focal position. In addition, with regard to the setting of the display/non-display of the position marker 502, the cameraman operates the user operation unit 102, selects a "DISPLAY" item, and sets "ON" or "OFF".

Figure 4A:
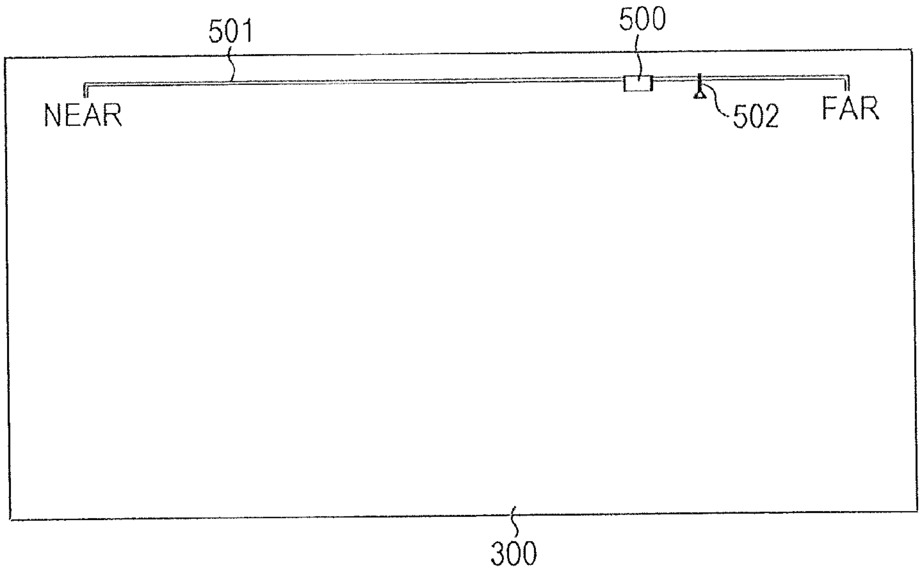
FIGS. 4A and 4B are diagrams illustrating examples of the display of the viewfinder after the focal position registration/edit mode is released.
Figure 4B:
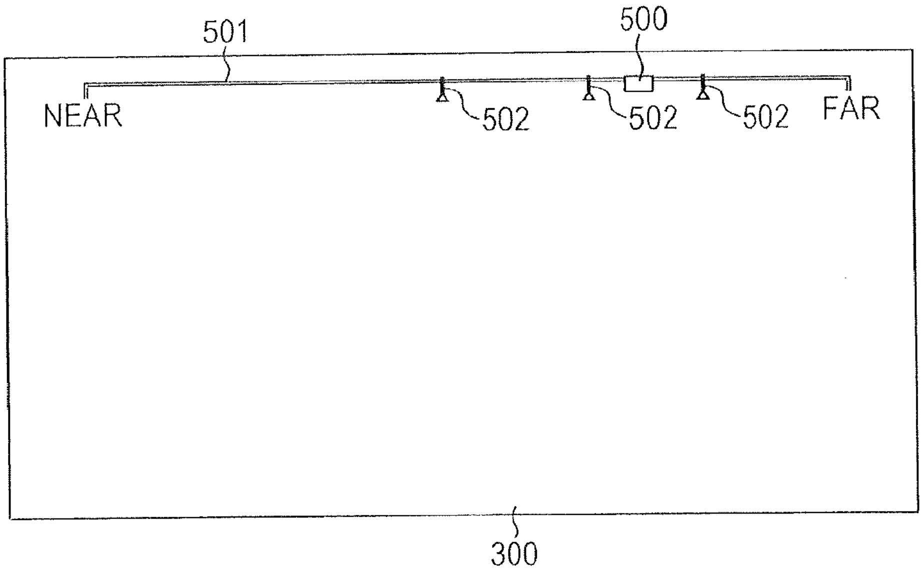

When the above-described process, such as the focal position (position marker) registration, is ended, the cameraman operates the user operation unit 102, and causes the camera CPU 101 to release the focal position registration/edit mode. FIG. 4A illustrates an example of the display of the viewfinder 300 after the focal position registration/edit mode is released, and illustrates a state in which the UI display related to editing disappears. In the example, only a single position marker 502 is displayed. Meanwhile, it is possible to register focal positions for a plurality of specific positions of a subject, and FIG. 4B illustrates an example of the display in such a case. Meanwhile, although a captured image is simultaneously displayed, the captured image is not shown here for the simplification of the drawings.

Subsequently, the display of the viewfinder 300 acquired when the camera system 10 is actually operated will be described. When the cameraman operates the focus demand 400 and performs focus adjustment, the current focal position information is transmitted from the lens CPU 201 of the lens apparatus 200 to the camera CPU 101 of the camera apparatus 100 through the cable 202.

A display control signal for generating an index display signal is supplied from the camera CPU 101 to the VF signal processing unit 105 based on the focal position information.

In the VF signal processing unit 105, the index display signal for displaying an index indicative of the current focal position is generated based on the display control signal, and the index display signal is combined with a captured image signal to be transmitted to the viewfinder 300.

Figure 5A:
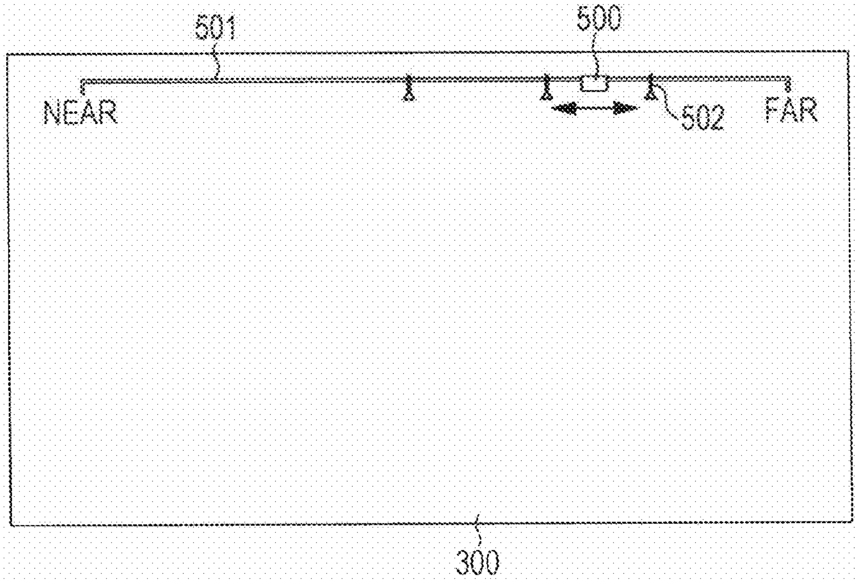
FIGS. 5A and 5B are diagrams illustrating the display of a position name when an index overlaps with a position marker.

Therefore, as shown in FIG. 5A, the index 500 indicative of the current focal position is displayed in the viewfinder 300. The index 500 moves according to change in the current focal position due to focus adjustment performed by the cameraman. Meanwhile although a captured image is simultaneously displayed, the captured image is not shown here for the simplification of the drawings.

When the cameraman focuses on the specific position of the subject, the cameraman performs focus adjustment such that the focal position corresponds to the specific position. Here, when the focal position to focus on the specific position is registered, the cameraman performs focus adjustment such that the index 500 approaches the position marker 502 indicative of the registered focal position. Therefore, it is possible to easily focus on the specific position.

Figure 5B:
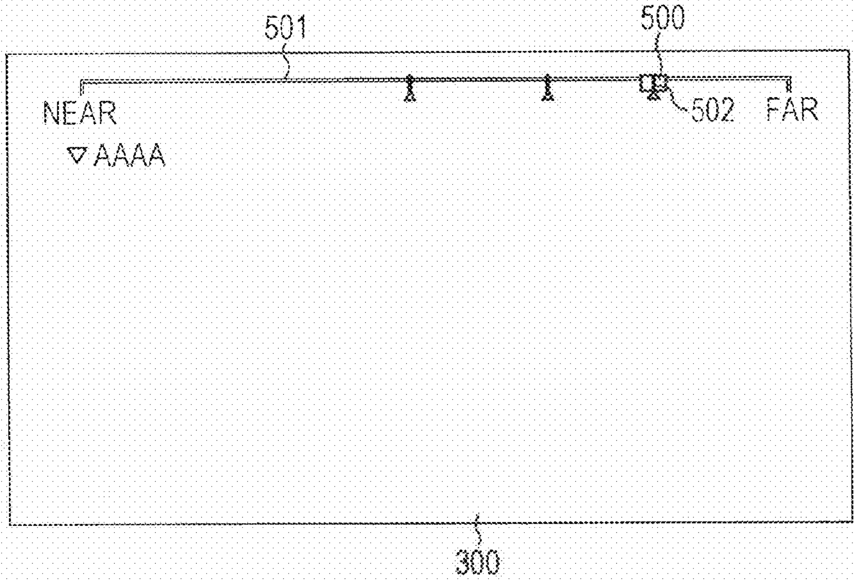

In the embodiment, when the index 500 overlaps with the position marker 502, the position name ("AAAA" in the example in the drawing) which is registered ancillary to the registered focal position (position marker) is displayed in the viewfinder 300, as shown in FIG. 5B. In this case, the camera CPU 101 determines that the index 500 overlaps with the position marker 502, generates the display control signal for generating the position name display signal based on the position name information, which is associated with the position marker 502 and stored in the memory 101*a*, and transmits the display control signal to the VF signal processing unit 105.

The VF signal processing unit 105 generates the position name display signal based on the display control signal. Further, the VF signal processing unit 105 combines the captured image signal with the position name display signal together with the index display signal and the position marker display signal, generates an image signal for the viewfinder, and transmits the image signal for the viewfinder to the viewfinder 300. Therefore, the position name is displayed in the viewfinder 300. Therefore, when a focal position indicated by the position marker 502 which overlaps with the index 500 is used, the cameraman can easily check which position of the subject is focused.

Figure 6:
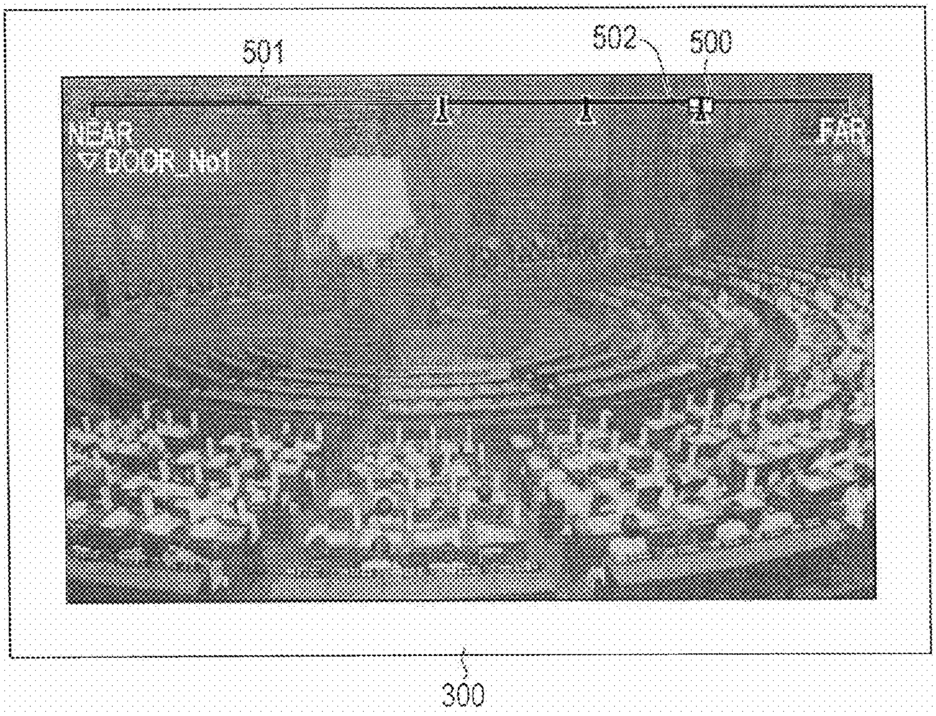
FIG. 6 is a diagram illustrating an example of the display of the viewfinder when the index overlaps with the position marker.
Figure 7:
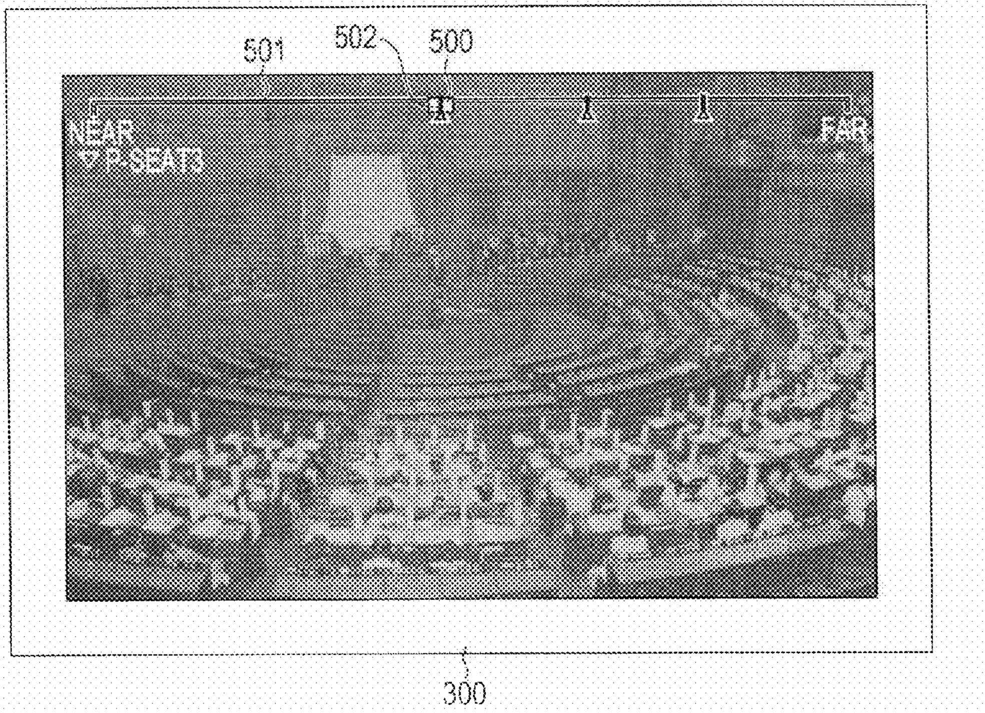
FIG. 7 is a diagram illustrating another example of the display of the viewfinder when the index overlaps with the position marker.

FIGS. 6 and 7 illustrate further detailed examples of the display of the viewfinder 300 corresponding to FIG. 5B. In the example of display of FIG. 6, the index 500 overlaps with a position marker 502 on the rightmost side from among three displayed position markers 502, and "DOOR_No1" is displayed as the position name. In addition, in the example of the display of FIG. 7, the index 500 overlaps with a position marker 502 on the leftmost side from among the three displayed position markers 502, and "P-SEAT3" is displayed as the position name.

Figure 8A:
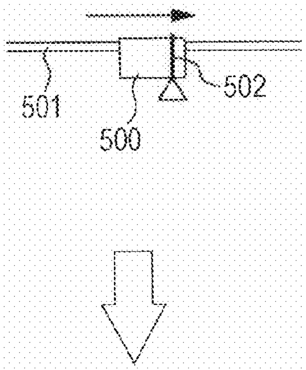
FIGS. 8A to 8D are diagrams illustrating the modifications of an index display state when the current focal position approximately coincides with a registered focal position.

When it is assumed that the focal position is the registered focal position indicated by the position marker 502, the cameraman performs focus adjustment from a state in which the index 500 starts to be overlapped with the position marker 502 until the current focal position approximately finally coincides with the registered focal position, as shown in FIG. 8A. Here, "approximately coincides" means that the current focal position enters the constant range in which the registered focal position is set to a center.

A user can adjust the size of the constant range continuously or step by step. In this case, the user adjusts the size of the constant range by, for example, performing a user operation (menu operation) based on the UI display using the user operation unit 102.

Figure 8B:
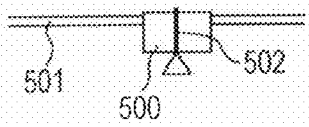

As described above, when the display width W of the index 500 is greater than the display width of the position marker 502 and the display of the index 500 overlaps with the display of the position marker 502 in the movement direction of the index 500, the position marker 502 is arranged in front of the index 500. Therefore, the cameraman can easily match the focal position to the registered focal position indicated by the position marker 502 based on the balance of the sizes of the right and left areas of the index 500 which are divided by the position marker 502, as shown in FIG. 8B.

Figure 8C:
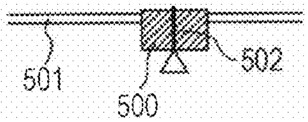
Figure 8D:
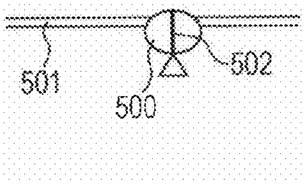

Meanwhile, when the current focal position approximately coincides with the registered focal position, that is, when the current focal position enters the constant range in which the registered focal position is set to a center, the fact may be displayed on any of the screen of the viewfinder 300. Here, for example, the change of the display state of the index 500, such as a shape and color may be taken into consideration. FIG. 8C illustrates an example in which a color is changed, and FIG. 8D illustrates an example in which a shape is changed. In this case, under the control of the camera CPU 101, an index display signal is generated in the VF signal processing unit 105 such that the display state of the index is changed. Meanwhile, the shape of the index 500 or the color and the shape of the index 500 may be changed instead of the color of the index 500.

Figure 9:
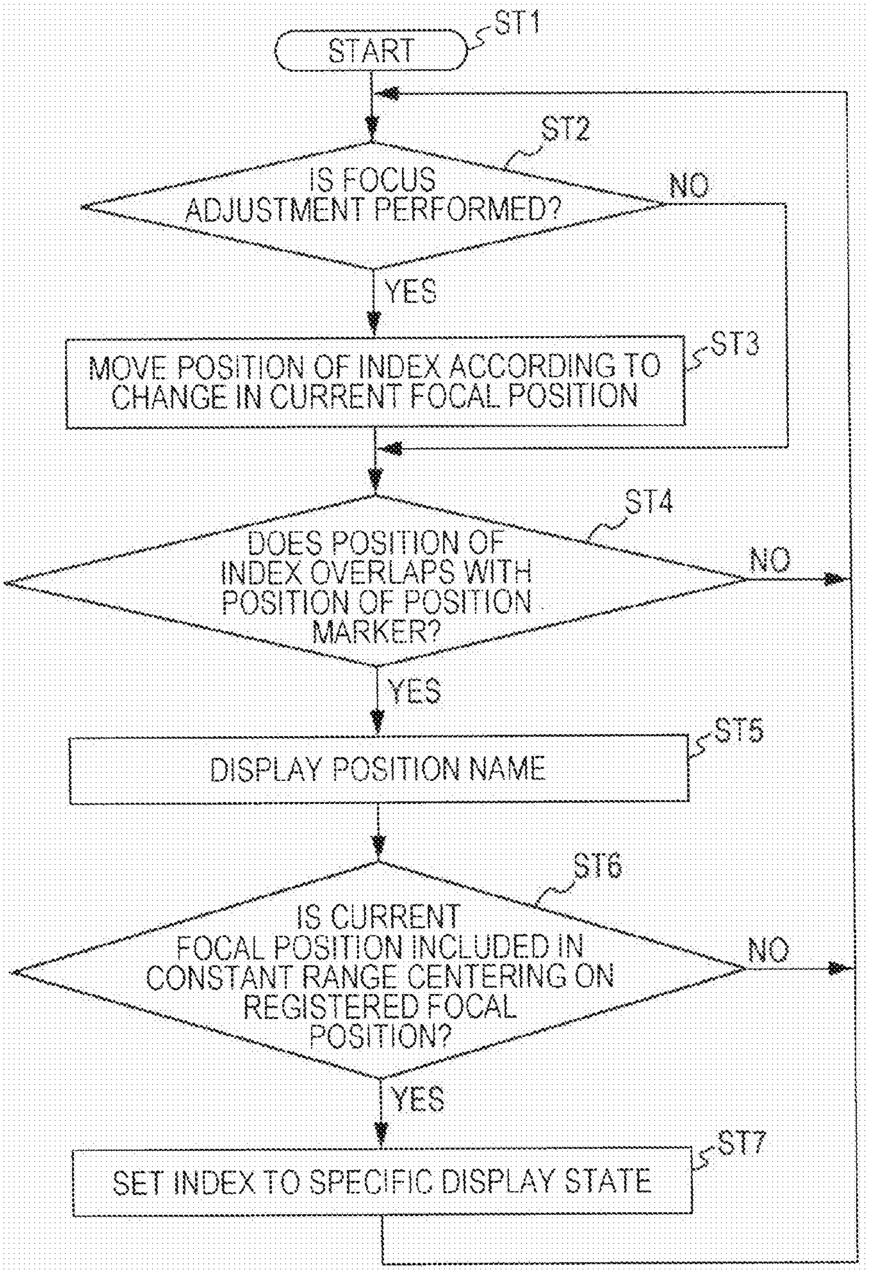
FIG. 9 is a flowchart illustrating an example of index display control performed by a camera CPU.

A flowchart in FIG. 9 illustrates an example of the control of the display of the index 500 or the like performed by the camera CPU 101. The camera CPU 101 starts a process in step ST1 and then proceeds to a process in step ST2. In step ST2, the camera CPU 101 determines whether or not focus adjustment is performed based on the operation of the focus demand 400 performed by the cameraman (user). When a focal position indicated by the current focal position information received from the lens CPU 201 of the lens apparatus 200 is changed, the camera CPU 101 determines that focus adjustment is performed.

When focus adjustment is performed, the camera CPU 101 moves the display position of the index 500 according to the change in the focal position in step ST3. Thereafter, the camera CPU 101 proceeds to a process in step ST4. When focus adjustment is not performed in step ST2, the camera CPU 101 immediately proceeds to the process in step ST4.

In step ST4, the camera CPU 101 determines whether or not the display position of the index 500 overlaps with the display position of the position marker 502. When the display position of the index 500 overlaps with the display position of the position marker 502, the camera CPU 101 displays a position (position marker) name which is registered in association with the position marker 502 in the viewfinder 300 in step ST5.

Further, the camera CPU 101 determines whether or not the current focal position is included in a constant range centering on the registered focal position indicated by the position marker 502 which overlaps with the index 500 in step ST6. When the current focal position is included in the constant range, the camera CPU 101 sets the index 500 to a specific display state in step ST7.

After the process in step ST7 is performed, the camera CPU 101 returns to the process in step ST2, and the same processes as described above are repeated. In addition, when the display position of the index 500 does not overlap with the display position of the position marker 502 in step ST4 and when the current focal position is not included in the constant range in step ST6, the camera CPU 101 returns to the process in step ST2 and repeats the same processes as described above.

As described above, in the camera system 10 shown in FIG. 1, it is possible to display the index 500 indicative of the current focal position in the viewfinder 300, together with the captured image. Therefore, for example, the cameraman can check the approximate position of the current focal position without moving away the line of sight of the viewfinder 300, thereby excellently performing focus adjustment using the focus demand 400.

In addition, in the camera system 10 shown in FIG. 1, it is possible to register the focal position in the camera apparatus 100, and it is possible to display the position marker 502 indicative of the registered focal position on the movement path of the index 500 in the viewfinder 300. Therefore, for example, the cameraman can easily focus on the specific position of the subject by operating the focus demand 400 such that the display position of the index 500 approaches the display position of the position marker 502.

In addition, in the camera system 10 shown in FIG. 1, the display width W of the index 500, which is displayed in the viewfinder 300, in the movement direction is relatively large. Therefore, it is possible to enhance, for example, the visibility of the index 500 by the cameraman.

In addition, in the camera system 10 shown in FIG. 1, the display width W of the index 500 in the movement direction of the index 500 is larger than the display width of the position marker 502, and the position marker 502 is arranged in front of the index 500 when the display of the index 500 overlaps with the display of the position marker 502. Therefore, for example, the cameraman can easily match the focal position to the registered focal position indicated by the position marker 502 based on the balance of the sizes of the right and left areas of the index 500 which are divided by the position marker 502.

In addition, in the camera system 10 shown in FIG. 1, it is possible to register the display color of the position marker 502 indicative of the focal position ancillary to the registration of the focal position in the camera apparatus 100, and it is possible to display the position marker 502 using the registered display color in the viewfinder 300. Therefore, when, for example, a plurality of focal positions are registered, the respective display colors are registered, and thus the cameraman can identify position markers relevant to a plurality of specific positions using the display colors.

In addition, in the camera system 10 shown in FIG. 1, it is possible to register a position name (the name or the like of a subject position to be focused) corresponding to the focal position ancillary to the registration of the focal position in the camera apparatus 100, and the position name corresponding to the focal position indicated by the prescribed position marker 502 is displayed in the viewfinder 300 when the display position of the index 500 overlaps with the display position of the prescribed position marker 502. Therefore, when, for example, the cameraman matches the index 500 to the prescribed position marker 502, the cameraman can easily check which position of the subject is focused.

In addition, in the camera system 10 shown in FIG. 1, when the current focal position enters the constant range in which the registered focal position is set to a center, the fact is displayed in the viewfinder 300. For example, the display state of the index 500 is changed. Therefore, for example, the cameraman can easily understand that the current focal position approximately coincides with the focal position indicated by the position marker 502.

2. Modification Example

Figure 10A:
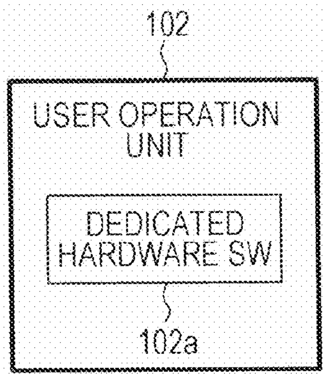
FIGS. 10A to 10C are diagrams illustrating the registration of the focal position using a dedicated hardware switch.

Meanwhile, in the above-described embodiment, an example, in which a focal position is registered in such a way that the cameraman (user) operates the user operation unit 102 and performs a user operation (menu operation) based on the UI display, is shown. However, as shown in FIG. 10A, a configuration, in which a dedicated hardware switch 102*a* for registering a focal position is provided in the user operation unit 102 and the registration of the focal position is enabled using the dedicated hardware switch 102*a*, may be taken into consideration.

Figure 10B:
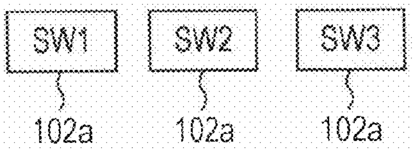

When the camera apparatus 100 can register, for example, at most N focal positions, the camera apparatus 100 can be configured such that some parts or all of the focal positions are registered using the dedicated hardware switches 102*a*. When M (M<=N) focal positions are registered using the dedicated hardware switches 102*a*, M dedicated hardware switches 102*a* are necessary. For example, as shown in FIG. 10B, when three dedicated hardware switches 102*a* are provided in the user operation unit 102, it is possible to register three focal positions using the dedicated hardware switches 102*a*.

Registration Operation Using Dedicated Hardware Switches

The camera CPU 101 performs operations to register a focal position and to release the registration based on the information about the operation of the dedicated hardware switches 102*a*. Here, the camera CPU 101 performs different operations based on whether the dedicated hardware switch 102*a* is an "alternate operation switch" or a "momentary operation switch".

Figure 10C:
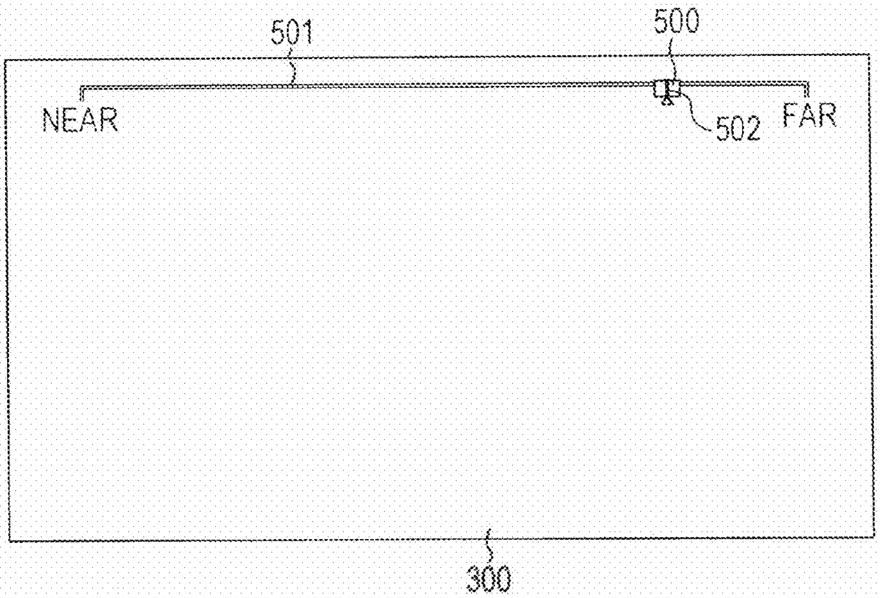

First, a case in which the dedicated hardware switch 102*a* is the "alternate operation switch" will be described. When the switch is turned on, the current focal position is registered in association with the switch, and the position marker 502 indicative of the registered focal position is displayed on the index 500 indicative of the current focal position in the viewfinder 300, as shown in FIG. 10C. In addition, when the switch is turned off, the registration of the focal position registered in association with the switch is released, and the display of the position marker 502 displayed in the viewfinder 300 is released.

Subsequently, a case in which the dedicated hardware switch 102*a* is the "momentary operation switch" will be described. When the switch is turned on in a case in which the focal position is not registered, the current focal position is registered in association with the switch, and the position marker 502 indicative of the registered focal position is displayed on the index 500 indicative of the current focal position in the viewfinder 300, as shown in FIG. 10C. In addition, when the switch is turned on in a case in which the focal position is registered, the registration of the focal position registered in association with the switch is released, and the display of the position marker 502 displayed in the viewfinder 300 is released.

When the dedicated hardware switch 102*a* is provided, it is possible to register the display color of the position marker 502 and, further, the position name corresponding to the registered focal position before or after the focal position is registered in association with each dedicated hardware switch 102*a*. In this case, the user performs registration by performing the user operation (menu operation) based on the UI display using, for example, the user operation unit 102.

Because the registration of the focal position using the dedicated hardware switch 102*a* is possible as described above, the user can simply perform the registration of the focal position and, further, the release of the registration without opening a menu.

In the above description, an example in which the dedicated hardware switch 102*a* is provided in the user operation unit 102 is shown. However, a configuration may be provided in which the dedicated hardware switch 102*a* is provided in external equipment, such as a controller, which is connected to the camera apparatus 100 in a wired or wireless manner instead of the camera apparatus 100, and the switch operation information of the dedicated hardware switch 102*a* is received from the external equipment.

In addition, in the above-described embodiment, an example in which the position name which is registered in association with the registered focal position (position marker) is displayed in the viewfinder 300 when the index 500 overlaps with the position marker 502 is shown (refer to "AAAA" of FIG. 5B).

Figure 11A:
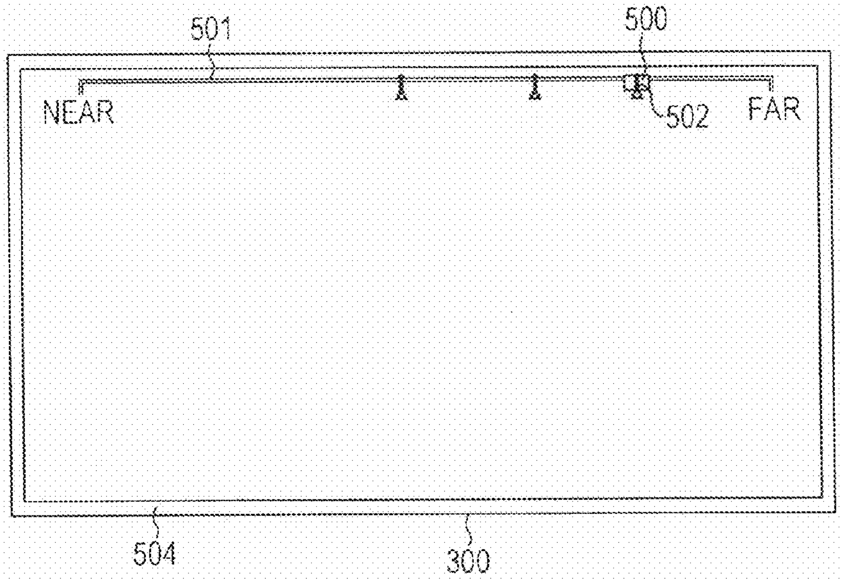
FIGS. 11A and 11B are diagrams illustrating the display of a color frame (screen frame) when the index overlaps with the position marker.

However, a configuration in which the same color as the display color of the position marker 502 is displayed in some or all areas of the ends of the captured image when the index 500 overlaps with the position marker 502, may be taken into consideration. FIG. 11A illustrates an example in which a rectangular color frame (screen frame) 504 is displayed in all of the ends of the captured image. Meanwhile, an upper end and a lower end or a left end and a right end, and the like may be taken into consideration as some of the ends of the captured image.

In this case, the camera CPU 101 determines that the index 500 overlaps with the position marker 502, generates a display control signal for generating a color display signal for displaying the same color at the ends of the captured image based on information of the display color of the position marker 502 stored in the memory 101*a* in association with the position marker 502, and transmits the display control signal to the VF signal processing unit 105.

The VF signal processing unit 105 generates the color display signal based on the display control signal. Further, the VF signal processing unit 105 generates the image signal for the viewfinder by combining the captured image signal with the color display signal, together with the index display signal, the position marker display signal, and the like, and transmits the image signal for the viewfinder to the viewfinder 300.

Therefore, the same color as the color of the position marker 502 with which the index 500 overlaps is displayed at the ends of the captured image displayed in the viewfinder 300. Therefore, the cameraman (user) can check which position marker 502 is matched with the index and which position of the subject is focused.

As described above, when the index 500 overlaps with the position marker 502 and when the configuration in which the same color as the display color of the position marker 502 is displayed in some or all areas of the ends of the captured image is provided, it is possible to save in labor for registering the position name, and it is possible to show that the index 500 overlaps with the position marker 502 using a minimum occupied screen area.

Figure 11B:
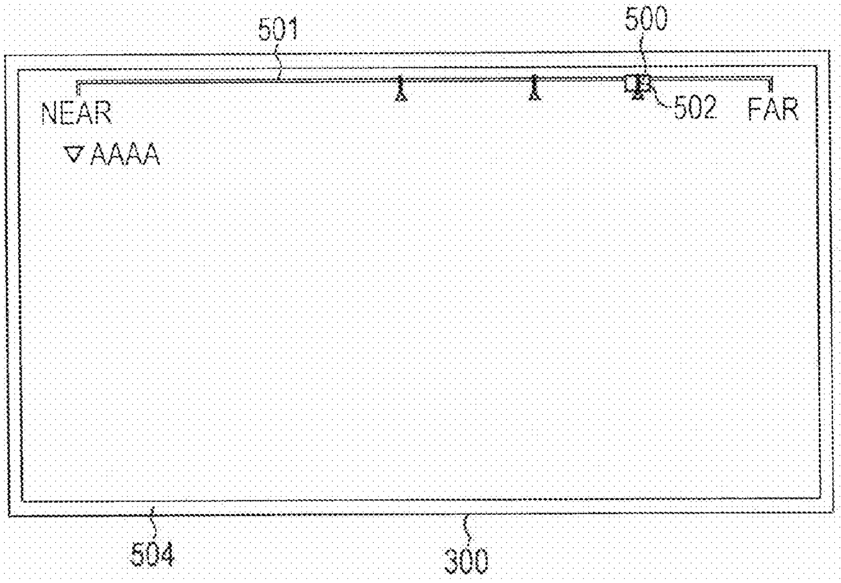

Meanwhile, as shown in FIG. 11B, when the index 500 overlaps with the position marker 502 and when the configuration in which the same display color (color frame 504) as the display color of the position marker 502 is displayed in some or all areas of the ends of the captured image is provided, the position names may be collectively displayed. In this case, there is an advantage in that the overlapping is emphasized.

Figure 12:
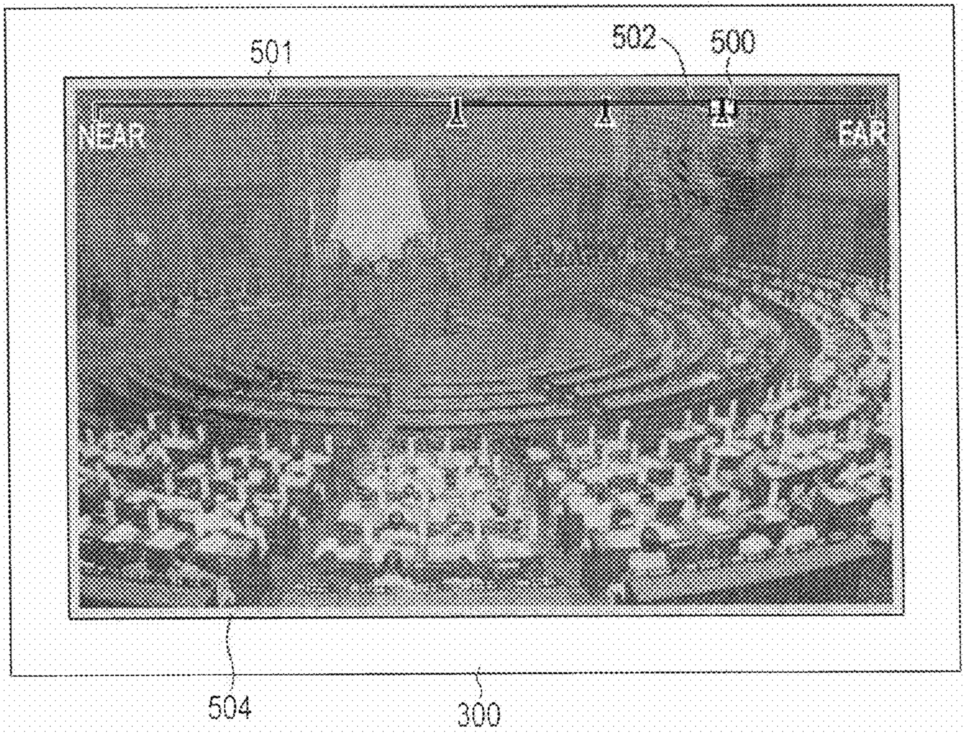
FIG. 12 is a diagram illustrating an example of the display of a viewfinder when the index overlaps with the position marker.
Figure 13:
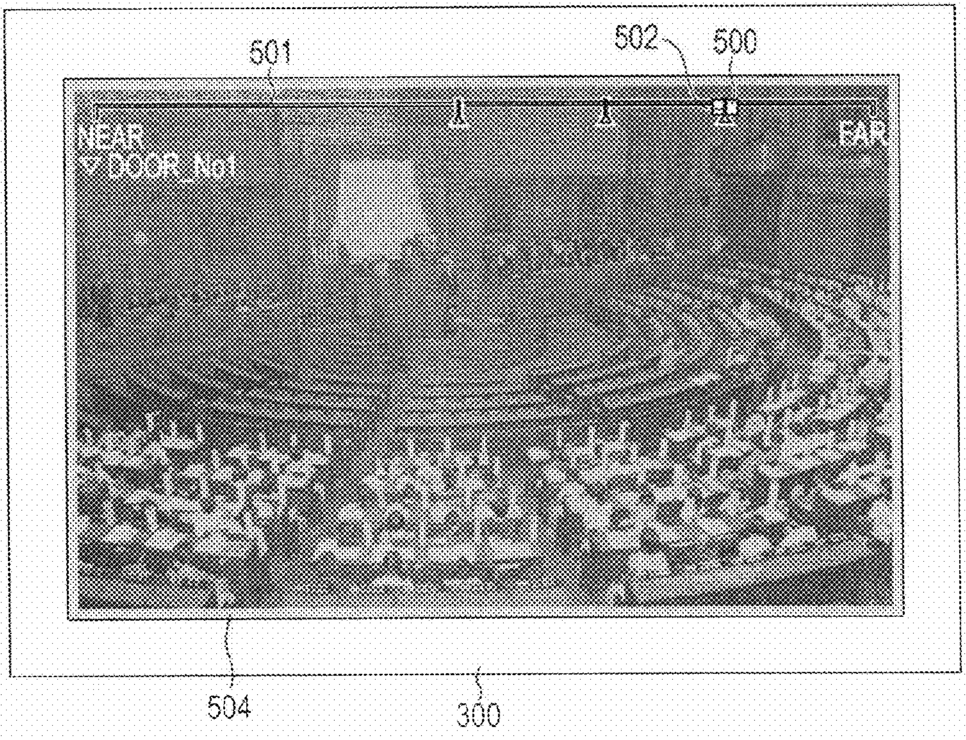
FIG. 13 is a diagram illustrating another example of the display of a viewfinder when the index overlaps with the position marker.

FIG. 12 illustrates an example of the display further in detail than the viewfinder 300 corresponding to FIG. 11A. In the example of the display, the index 500 overlaps with a position marker 502 on the rightmost side from among three displayed position markers 502, and the color frame 504 which has the same color as that of the position marker 502 is displayed at the ends of the captured image. In addition, FIG. 13 illustrates an example of the display further detail than the viewfinder 300 corresponding to FIG. 11B. In the example of the display, the index 500 overlaps with a position marker 502 on the rightmost side from among three displayed position markers 502, the color frame 504 which has the same color as that of the position marker 502 is displayed at the ends of the captured image, and "DOOR_No1" is displayed as the position name.

In addition, when the index 500 overlaps with the position marker 502, it is conceivable that the user can set any one of a mode in which only the position name display is performed (refer to FIG. 5B), a mode in which only the color display is performed (refer to FIG. 11A), and a mode in which both the position name display and the color display are performed (refer to FIG. 11B).

Figure 14:
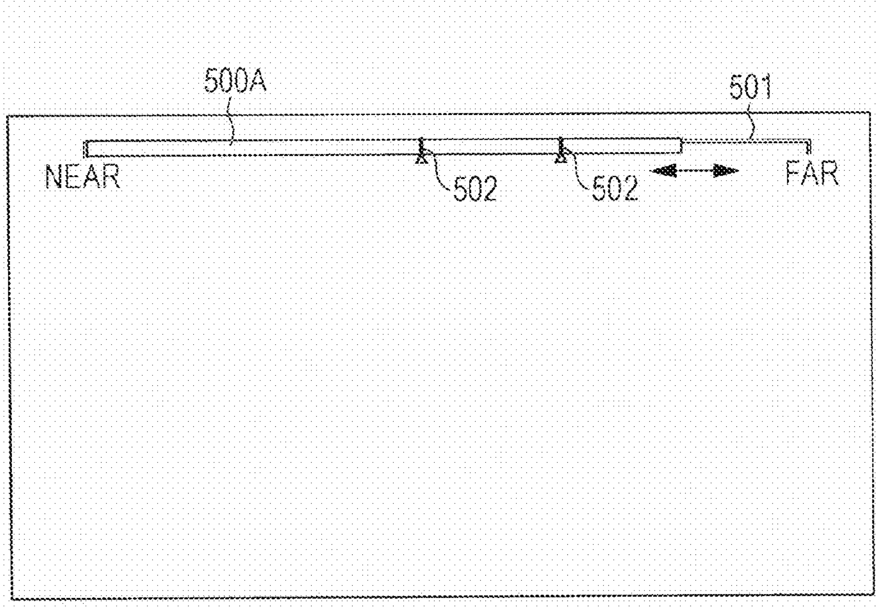
FIG. 14 is a diagram illustrating another example of an index indicative of the current focal position.

In addition, in the above-described embodiment, an example is illustrated in which the rectangular index 500 is displayed in the viewfinder 300 as the index indicative of the current focal position and the position of the index 500 moves according to the change in the focal position. However, as shown in FIG. 14, an example is conceivable in which a bar-shaped index 500A is displayed as the index indicative of the current focal position and the length of the index 500A expands and contracts according to the change in the focal position. In FIG. 14, the same reference numerals are attached to parts corresponding to FIG. 2A.

In addition, the present disclosure can include the following configurations.

(1) A camera apparatus including: a display signal generation unit that generates an index display signal for displaying an index indicative of a current focal position based on focal position information; and a combination unit that acquires an image signal for a viewfinder by combining a captured image signal with the index display signal.

(2) The camera apparatus of (1) further includes a focal position registration unit that registers a focal position, the display signal generation unit generates a position marker display signal for displaying a position marker indicative of the registered focal position on a movement path of the index, together with the index display signal, and the combination unit acquires the image signal for the viewfinder by combining the captured image signal with the index display signal and the position marker display signal.

(3) In the camera apparatus of (2), the focal position registration unit registers the current focal position according to a user operation based on a User Interface (UI) display.

(4) In the camera apparatus of (2), the focal position registration unit registers the current focal position based on information about an operation of a switch for registering the focal position.

(5) In the camera apparatus of (4), the focal position registration unit releases a focal position registration state based on the information about the operation of the switch for registering the focal position when the focal position registration unit is in the focal position registration state.

(6) In the camera apparatus of any one of (2) to (5), the display signal generation unit generates the index display signal and the position marker display signal such that the position marker is arranged in front of the index when a display width of the index in a movement direction of the index is larger than a display width of the position marker and a display of the index overlaps with a display of the position marker.

(7) The camera apparatus of (6) further includes a width adjustment unit that adjusts the display width of the index.

(8) The camera apparatus of any one of (2) to (7) further includes a display color registration unit that registers a display color of the position marker indicative of the focal position in association with registration of the focal position, and the display signal generation unit generates the position marker display signal for displaying the position marker indicative of the registered focal position such that the position marker is displayed using the registered display color.

(9) In the camera apparatus of (8), the display signal generation unit, when the display of the index overlaps with the display of the position marker, generates a color display signal for displaying the same color as the display color of the position marker in some or all areas of ends of the captured image, together with the index display signal and the position marker display signal, and the combination unit acquires the image signal for the viewfinder by combining the captured image signal with the index display signal, the position marker display signal, and the color display signal.

(10) The camera apparatus of any one of (2) to (9) further includes a position name registration unit that registers the position name corresponding to the focal position in association with registration of the focal position, the display signal generation unit, when the display of the index overlaps with the display of the position marker, generates a position name display signal for displaying the registered position name, together with the index display signal and the position marker display signal, and the combination unit acquires the image signal for the viewfinder by combining the captured image signal with the index display signal, the position marker display signal, and the position name display signal.

(11) In the camera apparatus of any one of (2) to (10), the display signal generation unit, when the current focal position indicated by the focal position information enters a constant range in which the registered focal position is set to a center, generates the index display signal such that a display state of the index is changed.

(12) The camera apparatus of (11) further includes a range adjustment unit that adjusts a size of the constant range.

(13) In the camera apparatus of (11) or (12), the change in the display state of the index includes change in a shape and a color.

(14) A method for generating an image signal for the viewfinder including: generating, by a display signal generation unit, an index display signal for displaying an index indicative of a current focal position based on focal position information; and acquiring an image signal for a viewfinder by combining a captured image signal with the index display signal.

It should be understood by those skilled in the art that various modifications, combinations, sub-combinations and alterations may occur depending on design requirements and other factors insofar as they are within the scope of the appended claims or the equivalents thereof.

What is claimed is:

1. A camera apparatus comprising:

circuitry configured to generate an index display signal to display an index indicating a current focal position based on focal position information such that the index is displayed along a guideline path;

acquire an image signal for a display by combining a captured image signal with the index display signal displayed along the guideline path;

receive an input from a user to register a user registered focal position;

register the user registered focal position;

generate a position marker display symbol to display a position marker indicating the user registered focal position; and acquire the image signal by combining the captured image signal with the index display signal and the position marker.

2. The camera apparatus of claim 1, wherein the circuitry is further configured to acquire the image signal by combining the captured image signal with the index display signal and the guideline path displayed.

3. The camera apparatus of claim 1, wherein the circuitry is further configured to register a name to the user registered focal position; and acquire the image signal by combining the captured image signal with the index display signal, the position marker, and the name.

4. The camera apparatus of claim 1, wherein the circuitry is further configured to register a color to the user registered focal position; and acquire the image signal by combining the captured image signal with the index display signal and the position marker such that the position marker is shown in the color.

5. The camera apparatus of claim 1, wherein the circuitry is further configured to register a plurality of the user registered focal positions;

generate a plurality of the position marker display symbols to display position markers indicating the plurality of user registered focal position; and acquire the image signal by combining the captured image signal with the index display signal and the plurality of position markers.

6. A camera apparatus comprising:

circuitry configured to generate an index display signal to display an index indicating a current focal position based on focal position information such that the index is displayed along a guideline path;

acquire an image signal for a display by combining a captured image signal with the index display signal displayed along the guideline path;

receive an input from a user to register a user registered focal position;

register the user registered focal position;

generate a position marker display symbol to display a position marker indicating the user registered focal position;

acquire the image signal by combining the captured image signal with the index display signal and the position marker; and acquire the image signal such that when the current focal position and the user registered focal position are within a predetermined range of each other, the index display signal and the position marker display signal are displayed in a predetermined display mode.

7. The camera apparatus of claim 6, wherein the predetermined display mode comprises a display mode in which the position marker is superimposed on the index display symbol.

8. The camera apparatus of claim 6, wherein the predetermined display mode comprises a display mode in which that a registered name associated with the user registered focal position is displayed.

9. The camera apparatus of claim 6, wherein the predetermined display mode comprises a display mode in which a display state of the index display symbol is changed.

10. The camera apparatus of claim 9, wherein the display state that is changed comprises a display shape.

11. The camera apparatus of claim 9, wherein the display state that is changed comprises a display color.

12. A method for generating an image signal for a camera apparatus, the method comprising:

generating, in circuitry, an index display signal to display an index indicating a current focal position based on focal position information such that the index is displayed along a guideline path;

generating the image signal by combining a captured image signal with the index display signal displayed along the guideline path;

receiving an input from a user to register a user registered focal position;

registering the user registered focal position;

generating a position marker display symbol to display a position marker indicating the user registered focal position; and acquiring the image signal by combining the captured image signal with the index display signal and the position marker.

13. A camera apparatus comprising:

an image sensor configured to capture a live view and to generate a live view image signal representing the live view;

an external viewfinder;

a user operation unit; and circuitry configured to receive a user input through the user operation unit to register a user registered focal position;

register the user registered focal position;

generate an index display signal representing a current focal position and a user registered position marker display signal representing the user registered focal position;

generate a viewfinder image by superimposing, on the live view image signal, the index display signal, the user registered position marker display signal, and a signal representing a guideline of movement for the index display signal and the user registered position marker display signal;

receive an input from a user to register a user registered focal position;

register the user registered focal position;

generate a position marker display symbol to display a position marker indicating the user registered focal position;

acquire the image signal by combining the captured image signal with the index display signal and the position marker; and control the external viewfinder to display the viewfinder image.

* * * * *